United States Patent
Chen

(10) Patent No.: US 7,323,839 B1
(45) Date of Patent: Jan. 29, 2008

(54) DIRECT CURRENT MOTOR CONTROLLING METHOD

(75) Inventor: Lung-Chieh Chen, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/514,865

(22) Filed: Sep. 5, 2006

(51) Int. Cl.
H02P 7/00 (2006.01)

(52) U.S. Cl. .................. 318/268; 388/907.5; 318/244; 318/245; 318/138; 318/254; 318/439; 318/720; 318/721; 318/722; 318/723; 318/724; 318/685; 318/696; 318/701

(58) Field of Classification Search .............. 388/811
See application file for complete search history.

(56) References Cited

U.S. PATENT DOCUMENTS 4,638,225 A * 1/1987 Morinaga et al. .......... 388/801
4,841,207 A * 6/1989 Cheyne ....................... 388/811
5,801,504 A * 9/1998 Endo et al. ................. 318/434
5,825,972 A * 10/1998 Brown ........................ 388/811
2006/0049784 A1* 3/2006 Suzuki ........................ 318/139

* cited by examiner

Primary Examiner—Lincoln Donovan
Assistant Examiner—Michael Brandt
(74) Attorney, Agent, or Firm—Rosenberg, Klein & Lee

(57) ABSTRACT

A direct current motor controlling method includes a mean for transforming a duty signal to computed value by a microprocessor unit. The microprocessor unit computes the computed value and then produces a target value by executing a dichotomy method, a rotation method and a transformed function, capable of reducing executing time and executing load of the microprocessor unit and saving memory space. The microprocessor unit sends a frequency signal to a driving circuit unit according to the target value. The driving circuit unit receives the frequency signal and then provides a driving voltage to a power switch. The power switch provides a voltage to a direct current motor or not according to the driving voltage for controlling output performance of the direct current motor.

13 Claims, 6 Drawing Sheets

| Low Precision | | | High Precision | | |
|---|---|---|---|---|---|
| Duty of Motor (%) | Duty Level | Target Value | Duty of Motor (%) | Duty Level | Target Value |
| 0.00 | 0 | 0 | 0.00 | 0 | 0 |
| 0.79 | 1 | 0 | 0.39 | 1 | 0 |
| 1.57 | 2 | 0 | 0.78 | 2 | 0 |
| 2.36 | 3 | 0 | 1.18 | 3 | 0 |
| 3.15 | 4 | 0 | 1.57 | 4 | 0 |
| 3.94 | 5 | 0 | 1.96 | 5 | 0 |
| 4.72 | 6 | 0 | 2.35 | 6 | 0 |
| 5.51 | 7 | 0 | ⋮ | ⋮ | ⋮ |
| 6.30 | 8 | 0 | | | |
| 7.09 | 9 | 0 | 5.49 | 14 | 0 |
| 7.87 | 10 | 0 | 5.88 | 15 | 0 |
| 8.66 | 11 | 0 | 6.27 | 16 | 0 |
| 9.45 | 12 | 0 | 6.67 | 17 | 0 |
| 10.24 | 13 | 31 | 7.06 | 18 | 0 |
| 11.02 | 14 | 32 | 7.45 | 19 | 0 |
| 11.81 | 15 | 33 | 7.85 | 20 | 0 |
| | | | 8.24 | 21 | 0 |
| | | | 8.36 | 22 | 0 |
| | | | 9.02 | 23 | 0 |
| | | | 9.41 | 24 | 0 |
| | | | 9.80 | 25 | 31 |
| | | | 10.20 | 26 | 31 |
| 88.98 | 113 | 132 | 10.59 | 27 | 32 |
| 89.76 | 114 | 133 | ⋮ | ⋮ | ⋮ |
| ⋮ | ⋮ | ⋮ | 89.41 | 228 | 132 |
| 97.64 | 124 | 133 | 89.80 | 229 | 133 |
| 98.43 | 125 | 133 | 90.20 | 230 | 133 |
| 99.21 | 126 | 133 | ⋮ | ⋮ | ⋮ |
| 100.00 | 127 | 133 | 100.00 | 255 | 133 |

FIG. 5

| Duty(%) | Target Value |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 31 |
| ⋮ | ⋮ |
| 89 | 132 |
| 90 | 133 |
| 91 | 133 |
| ⋮ | ⋮ |

FIG. 9
(Prior Art)

DIRECT CURRENT MOTOR CONTROLLING METHOD

BACKGROUND OF THE INVENTION

1. Field of the Invention

The invention relates to a direct current motor controlling method, and particularly to a method for controlling output performance of a direct circuit motor.

2. The Related Art

Nowadays direct current (DC) motors are utilized in many apparatuses such as a computer fan, a car fan, an electronic bike and a hair dryer etc. The requirement of the DC motors is altered by different fields. However, output performance of the DC motor is most important.

A conventional controlling device for controlling output performance of the DC motors is disclosed in FIG. 7. The controlling device 900 includes a microprocessor unit (MPU) 901 and a pulse width modulation (PWM) unit 903 and a DC motor 905. The MPU 901 receives a duty signal having a cycle time value and a work time value of the motor. The MPU 901 computes the cycle time value and the work time value and then produces a duty value through the following function:

$$dutyvalue = worktime \div cycletime \times 100\%$$

Referring to FIG. 8, in this case, the duty signal of the motor is a square wave signal. The MPU 901 receives the duty signal having the work time value of the motor and the cycle time value of the motor and then the duty value based on the fetched work time value and cycle time value will be further computed by the above-indicated function. In this case, the duty value is 10%.

Please refer to FIG. 9. After the MPU 901 generating the computed duty value as 10%, the MPU 901 compares the computed duty value to all duty values listed in a data table in order to find out a target value corresponding to the computed duty value. Based upon the table shown in FIG. 9, it takes 10 steps for the MPU 901 to find out the target value as 31 when the computed duty value is 10 (means 10%). However, when the computed duty value is 90, the MPU 901 must execute 90 processing times for finding out the target value which is 133. Once the target value is retrieved, the MPU 901 sends the target value to the PWM unit 903. The PWM unit 903 receives the target value and then transmits a variable frequency signal to a DC motor 905 according to the target value for controlling output performance of the DC motor 905.

However, the controlling device 900 sustained defects, such as: 1) the process of computing the cycle time value and the work time value and then producing the duty value through the above-indicated function increases executing load and executing time of the MPU 901 because of the above-indicated function including multiplication and division; 2) because the data table saved the duty value and the target value stored in the memory of the MPU 901, the used memory space of the MPU 901 is increased, and 3) the process of comparing the computed duty value to all the duty values listed in the data table step by step for getting the target value increases executing time of the MPU 901.

SUMMARY OF THE INVENTION

An object of the present invention is to provide a controlling method for a direct current motor capable of controlling output performance of the direct current motor.

According to the invention, the controlling method has following steps:

Step 1: Receiving a duty signal of a motor and then transforming the duty signal to computed value by a microprocessor unit, computing the computed value and then producing a target value by executing a dichotomy method, a rotation method and a transformed function capable of reducing executing time and executing load of the microprocessor unit and saving memory space;

Step 2: receiving a frequency signal from the microprocessor unit to a driving circuit unit and then driving a power switch to provide a voltage to the direct current motor or not by the driving circuit unit;

Step 3: detecting status of the direct current motor and then sending the status signal of the direct current motor to the direct current motor voltage feedback unit by a direct current motor voltage detecting unit;

Step 4: receiving the status signal of the direct current motor and transmitting a compared signal to the microprocessor unit by the direct current motor voltage feedback unit; and Step 5: after receiving the compared signal, modifying the frequency signal according to result of the compared signal compared to the target value for controlling output performance of the direct current motor.

BRIEF DESCRIPTION OF THE DRAWINGS

The present invention will be apparent to those skilled in the art by reading the following description of a preferred embodiment thereof, with reference to the attached drawings, in which:

FIG. 5 is a table showing duty levels and target values in columns labeled high precision and low precision according to the present invention;

FIG. 9 is a conventional data table showing duty of the motor and target value of the direct current motor;

DETAILED DESCRIPTION OF THE PREFERRED EMBODIMENT

Figure 1:
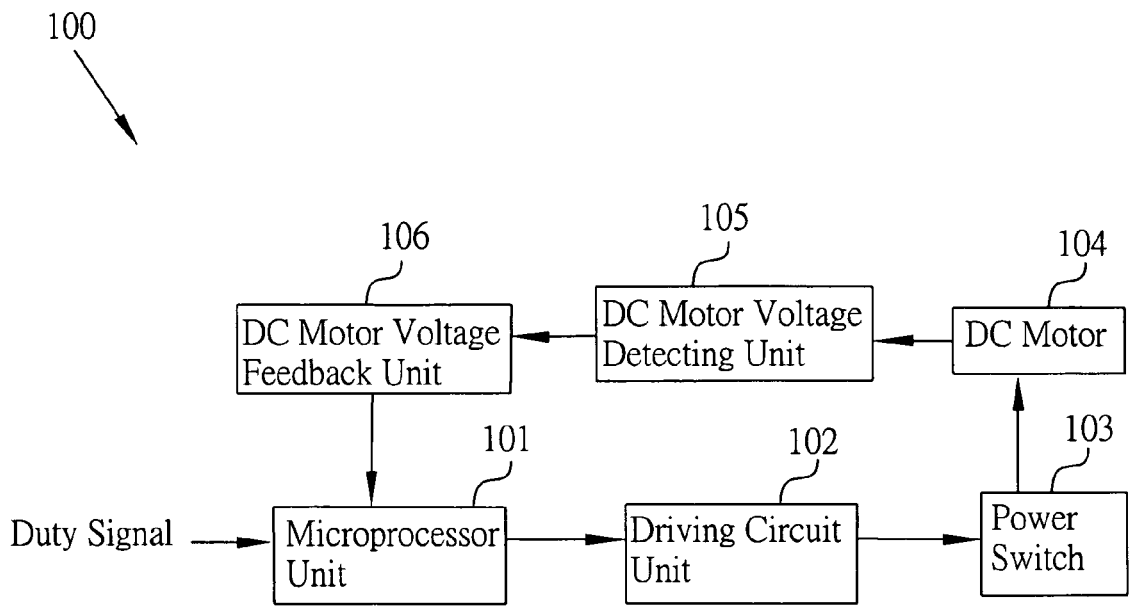
FIG. 1 is a block diagram of a controlling device according to the present invention.
Figure 2:
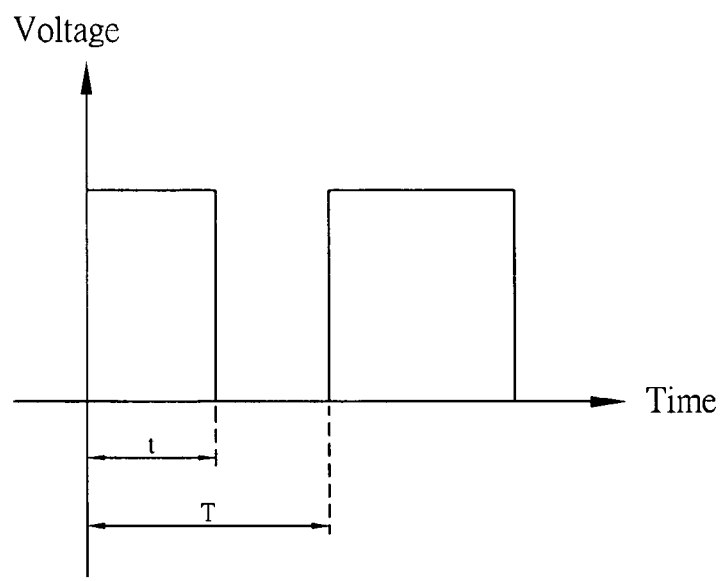
FIG. 2 is a square wave chart according to the present invention.
Figure 3:
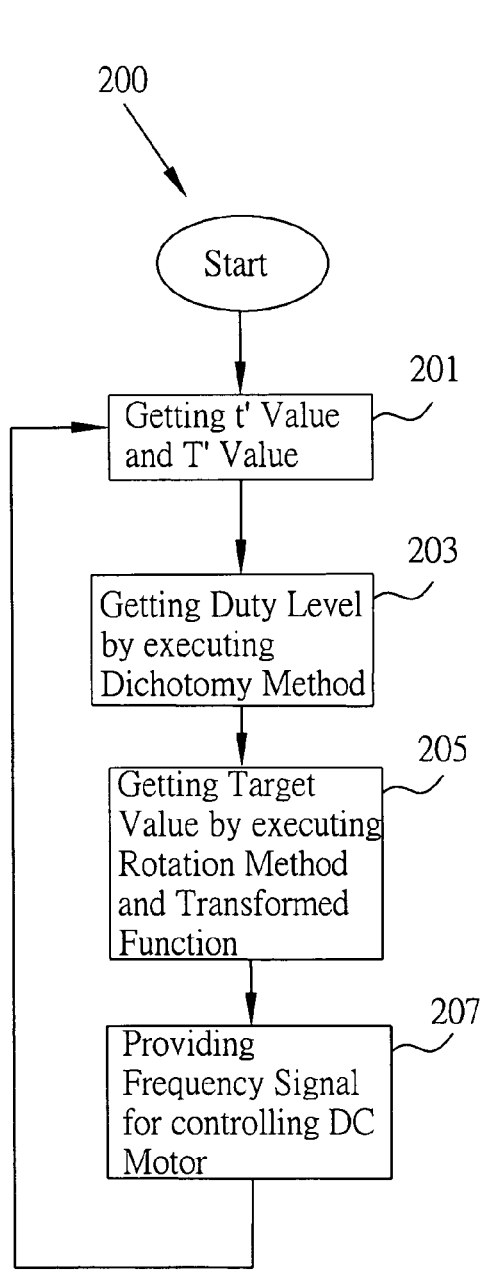
FIG. 3 is a flow chart showing a controlling method according to the present invention.

Firstly referring to FIG. 1 to FIG. 3, a preferred embodiment of a controlling device 100 according to the present invention includes a microprocessor unit (MPU) 101, a driving circuit unit 102 and a power switch 103. A preferred embodiment of a controlling method 200 according to the present invention is disclosed as follows. As shown in step 201, the microprocessor unit 101 receives a duty signal representing to working situation of a motor. In this case, the duty signal of the motor such as a square wave signal (as shown in the FIG. 2) has a cycle time (T) signal and a work time (t) signal. The T signal indicates working cycle time of the motor and the t signal indicates real working time of the motor. So hold time of the T signal is longer than hold time of the t signal.

After receiving the duty signal, the MPU 101 transforms the T and t signal to a T' value and a t' value by a counter function or a timer function. In this case, the counter function counts the hold time of the T signal and t signal and then produces the T' value and t' value. Therefore, the T' and t' value respectively represent the working cycle time and the real working time of the motor. So the T' value is not smaller than the t' value.

As shown in step 203, after getting the T' and t' value, the MPU 101 produces a duty level by executing a dichotomy method 203. In step 205, after the duty level is computed, the MPU 101 computes the duty level to produce a target value by executing a rotation method and a transformed function. The dichotomy method 203, rotation method and transformed function will be discussed afterwards.

In step 207, the microprocessor 101 sends a frequency signal according to the target value to the driving circuit unit 102. In this case, the frequency signal is a pulse width modulation (PWM) signal. The driving circuit unit 102 such as a step-up circuit electronically coupled to the MPU 101, and the power switch 103 receives the PWM signal and then sends a driving voltage according to the PWM signal to the power switch 103. The power switch 103 electronically coupled with the DC motor 104 is configured for switching on and off according to the driving voltage. In the manner, the power switch 103 switching to on or off indicates a voltage provided to the DC motor 104 or not.

Figure 4:
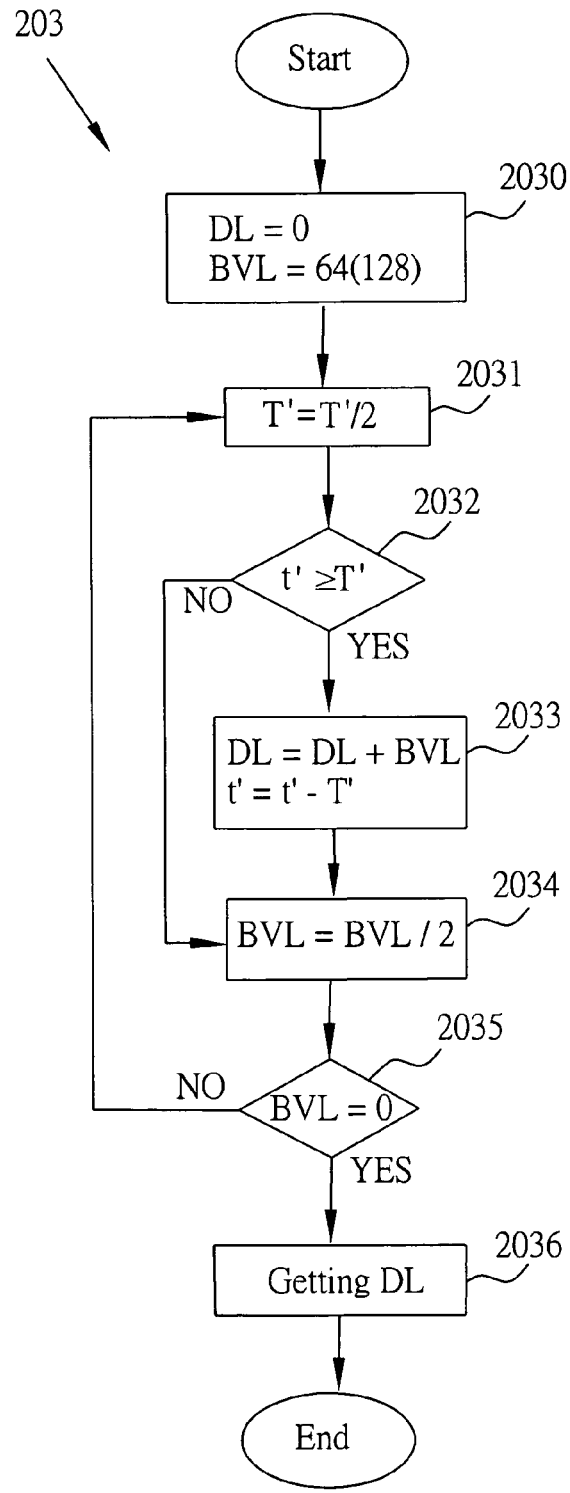
FIG. 4 is a flow chart showing a dichotomy method of the controlling method according to the present invention.

The dichotomy method 203 is described in FIG. 4. The duty level is indicated as DL in FIG. 4. Firstly, the MPU 101 is destined to one kind of precisions and then initials the duty level and a base value in step 2030. The base value is indicated as BVL in FIG. 4. The MPU 101 is an 8-bit microprocessor unit. When the MPU 101 is destined to low precision, the duty signal of the motor is represented to 128 kinds of constants. Furthermore, the duty signal is represented to 256 kinds of constants if the MPU 101 is destined to high precision. If low precision is determined, the MPU 101 initials the duty level to 0 and the base value to 64. Otherwise, the duty level is initialed to 0 and the base value is initialed to 128 if high precision is determined.

Figure 6:
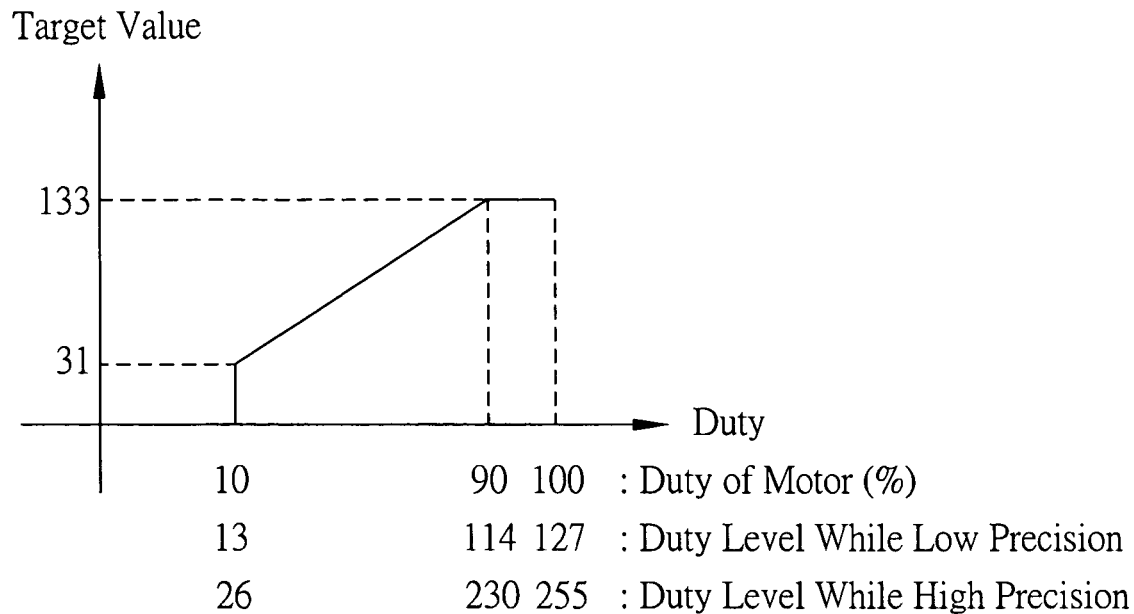
FIG. 6 is a chart demonstrating specific curve line of a direct current motor according to the present invention.
Figure 7:
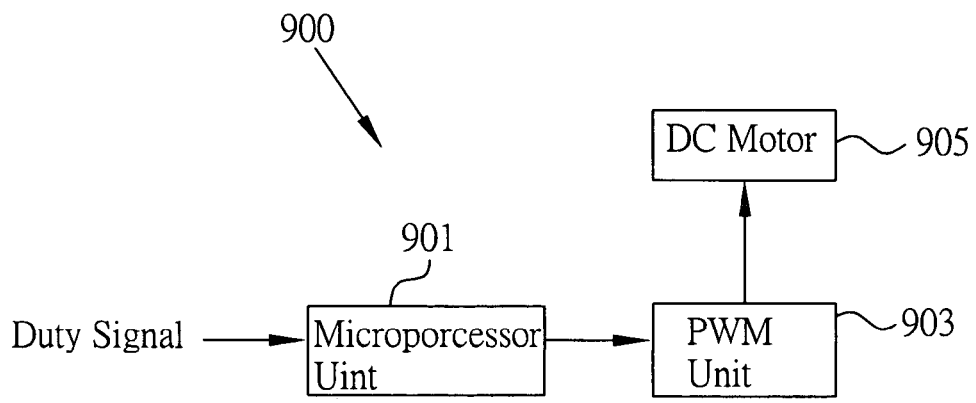
FIG. 7 is a circuit block diagram showing a conventional controlling device.
Figure 8:
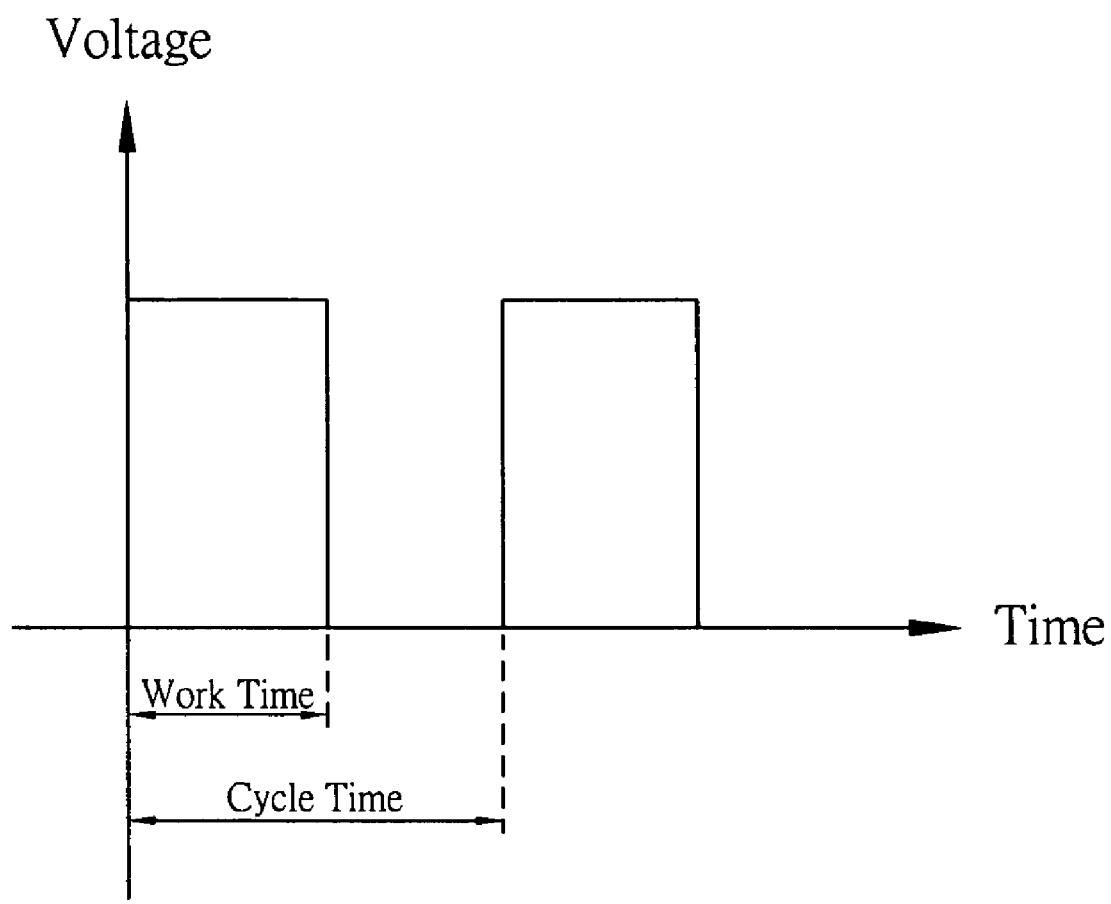
FIG. 8 is a conventional square wave showing duty of the motor.

In step 2031, the MPU 101 subtracts the T' value from one half. In step 2032, the MPU 101 compares the T' value to the t' value. If the t' value is not smaller than the T' value, the MPU 101 executes step 2033, otherwise, the MPU 101 executes step 2034. In step 2033, the duty level is accumulated to the base value and the t' value is subtracted from the T' value. In step 2034, the base value is subtracted from one half. In step 2035, the base value is compared to 0. If the base value is equal to 0, the MPU 101 executes step 2036, otherwise, the MPU 101 executes the step 2031. In step 2036, the duty level is result and then the dichotomy method 203 is terminated;

Please refer to FIG. 5 and FIG. 6. In this case, the DC motor 104 is designed to have three working status. While duty of the motor is smaller than 10%, the duty level in low precision is smaller than 13. In this case, the DC motor 104 is inactive. No voltage is provided to the DC motor 104. While duty of the motor is between 10% and 89%, the duty level in low precision is between 13 and 113. The output performance of the DC motor 104 is increased by following the duty of the motor. However, if the duty of the motor is over 89%, the duty level in low precision is bigger than 113, the DC motor 104 is working with full performance.

In case that duty of the motor is between 10% and 89% and the MPU 101 is destined to low precision, the T' value is 127 and the t' value is 13. The computed result of the duty level would be 13 by the MPU 101 from executing the dichotomy method 203. Furthermore, when the T' value is 127 and the t' value is 113, the duty level is 113 by executing the dichotomy method 203. However, if high precision is determined, the T' value is 255 and the t' value is 26, the computed result of the duty level by executing the dichotomy method is 26. Moreover, when the T' value is 255 and the t' value is 228, the duty level is 228 by executing the dichotomy method.

Referring to FIG. 3. In step 204, when the duty level is produced by executing the dichotomy method, the MPU 101 computes the duty value to produce the target value by executing the rotation method and the transformed function. The rotation method is represented as follows:

$$dutylevel/n, n\in 1,2,3,4,5,\ldots;$$

if n is 1, the duty level is arithmetic rotated to right 1 bit, if n is 2, the duty level is rotated to right 2 bit, etc. In this case, because of the MPU 101 is an 8-bit microprocessor unit, the maximum of n is 7. In this case, when the MPU 101 is set to low precision, the transformed function (1) is designed as follows:

$$targetvalue=dutylevel+dutylevel/7+18;$$

otherwise, when the MPU 101 is set to high precision, the transformed function (2) is designed as follows:

$$targetvalue=dutylevel/1+18;$$

Please refer to FIG. 5. While the MPU 101 is set to low precision and the duty level is 13, the target value is 31 by executing the transformed function 1. Furthermore, while duty level is 113, the target value is 132 by executing the transformed function (1). Otherwise, while the MPU 101 determines the high precision and the duty level is 26, the target value is 31 by executing the transformed function (2). While duty level is 228, the target value is 132 by executing the transformed function 2.

Referring to FIG. 1 again, the controlling device 100 further includes a DC motor voltage detecting unit 105 and a DC voltage feedback unit 106. The DC motor voltage detecting unit 105 detects status of the DC motor 104 and sends a status signal such as a voltage signal to the DC motor voltage feedback unit 106. The DC motor voltage feedback unit 106 such as a step-down circuit, electronically coupled to the DC motor voltage detecting unit 105 and the MPU 101, receives the status signal and transforms the status signal to a compared signal capable of computing by the MPU 101, and then sends the compared signal to MPU 101.

The MPU 101 receives the compared signal and compares the compared signal to the target value for modifying the PWM signal, and then sends the modified PWM signal to the driving circuit unit 102. The driving circuit unit 102 adjusts the driving voltage according to the modified PWM signal and then provides the driving voltage to drive the power switch 103. In this manner, the power switch 103 controls the output performance of the DC motor 104 according to the PWM signal produced by the MPU 101.

In this case, the controlling device 100 and the controlling method 200 are capable of reducing executing load of the MPU 101, reducing executing time of the MPU 101 and saving memory space by executing the dichotomy method 203, the rotation method and the transformed function. Furthermore, the transformed function is easy to be modified for various requirement of the output performance of the DC motor 104. The output performance of the DC motor 104 is controlled because the power switch 103 is arranged to provide the voltage to the DC motor 104 and cut off the voltage from the DC motor 104 according to the target value provided from the MPU 101.

The foregoing description of various implementations has been presented for the purposes of illustration and description. It is not intended to be exhaustive or to limit the scope to the precise form disclosed. Many modifications and variations are possible in light of the above teaching. Such modifications and variations are intended to be included within the scope of this invention as defined by the accompanying claims.

What is claimed is:

1. A controlling method for a direct current motor, comprising:
   getting a duty signal by a microprocessor unit and then transforming the duty signal to computed value by a function;
   producing a duty level after computing the computed value by a microprocessor from executing a dichotomy method, after producing said duty level, said microprocessor unit producing a target value by executing a rotation method and a transformed function;
   according to said target value, said microprocessor unit providing a frequency signal to a driving circuit unit, according to said frequency signal received from said microprocessor unit, providing a driving voltage to a power switch by said driving circuit unit;
   according to said driving voltage, said switch power providing a voltage to said direct current motor or not in order to controlling output performance of said direct current motor;
   providing a status signal after detecting said direct current motor by a direct current motor voltage detecting unit;
   transforming said status signal received from said direct current motor voltage detecting unit to a compared signal and then providing said compared signal to said microprocessor unit by a direct current motor voltage feedback unit; and
   while said compared signal received from said direct current motor voltage feedback unit, comparing said compared signal to said target value for modifying said frequency signal and then sending said modified frequency signal to said driving circuit unit by said microprocessor unit.

2. The controlling method as claimed in claim 1, wherein said duty signal comprises a first signal and a second signal; hold time of said first signal is longer than hold time of said second signal.

3. The controlling method as claimed in claim 1, wherein said computed value comprises a first value and a second value for computing by said microprocessor unit, wherein said first value is larger than said second value.

4. The controlling method as claimed in claim 1, wherein said function is a counter function.

5. The controlling method as claimed in claim 1, wherein said function unit is a timer function.

6. The controlling method as claimed in claim 1, wherein said frequency signal is a pulse width modulation signal.

7. The controlling method as claimed in claim 1, wherein said driving circuit unit is a step-up circuit.

8. The controlling device as claimed in claim 1, wherein said status signal is a voltage signal.

9. The controlling device as claimed in claim 1, wherein said direct current motor voltage feedback unit is a step-down circuit.

10. The controlling method as claimed in claim 3, wherein said dichotomy method comprises:
    step 1: determining one kind of precisions and initialing said duty level and a base value;
    step 2: subtracting said third value from one half;
    step 3: comparing said first value to said second value, while said second value is larger than or equal to said first value, executing step 4, otherwise, executing step 5;
    step 4: said duty level is accumulated to said base value and said second value is subtracted from said first value;
    step 5: subtracting said base value from one half; and
    step 6: while said base value is equal to 0, said duty level is result and then said dichotomy method is terminated, otherwise, executing said step 2.

11. The controlling method as claimed in claim 10, wherein said kinds of precision comprises low precision and high precision, said base value is initialed to 64 while low precision, said base value is initialed to 128 while high precision, duty level is initialed to 0.

12. The controlling method as claimed in claim 1, wherein said rotation method is said duty level arithmetic rotated to right.

13. The controlling method as claimed in claim 12, wherein said transformed function is targetvalue=dutylevel+dutylevel/7+18 when low precision is determined, otherwise said transformed function is targetvalue=dutylevel/1+18 when high precision is determined.

* * * * *